No. 718,994. PATENTED JAN. 27, 1903.
G. E. EVANS.
COMBINED LISTER PLOW AND PLANTER.
APPLICATION FILED MAY 13, 1901.
NO MODEL. 2 SHEETS—SHEET 2.
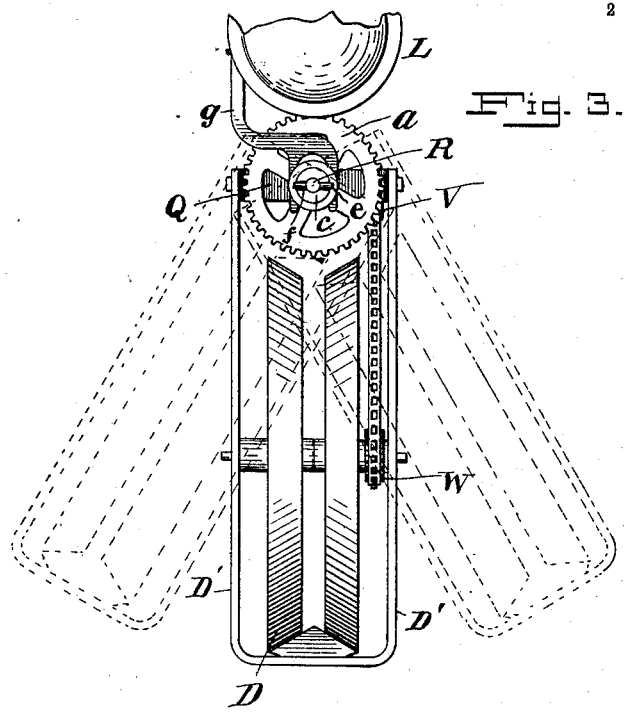
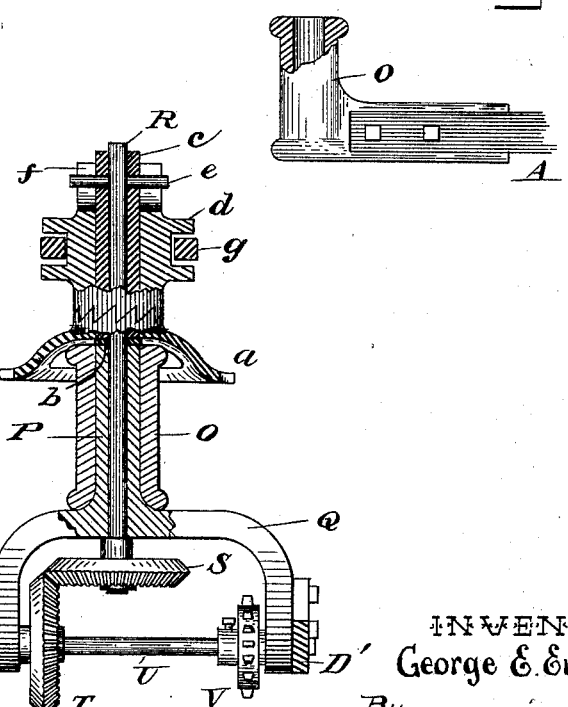
WITNESSES
INVENTOR
George E. Evans
By L. M. Thurlow
atty.

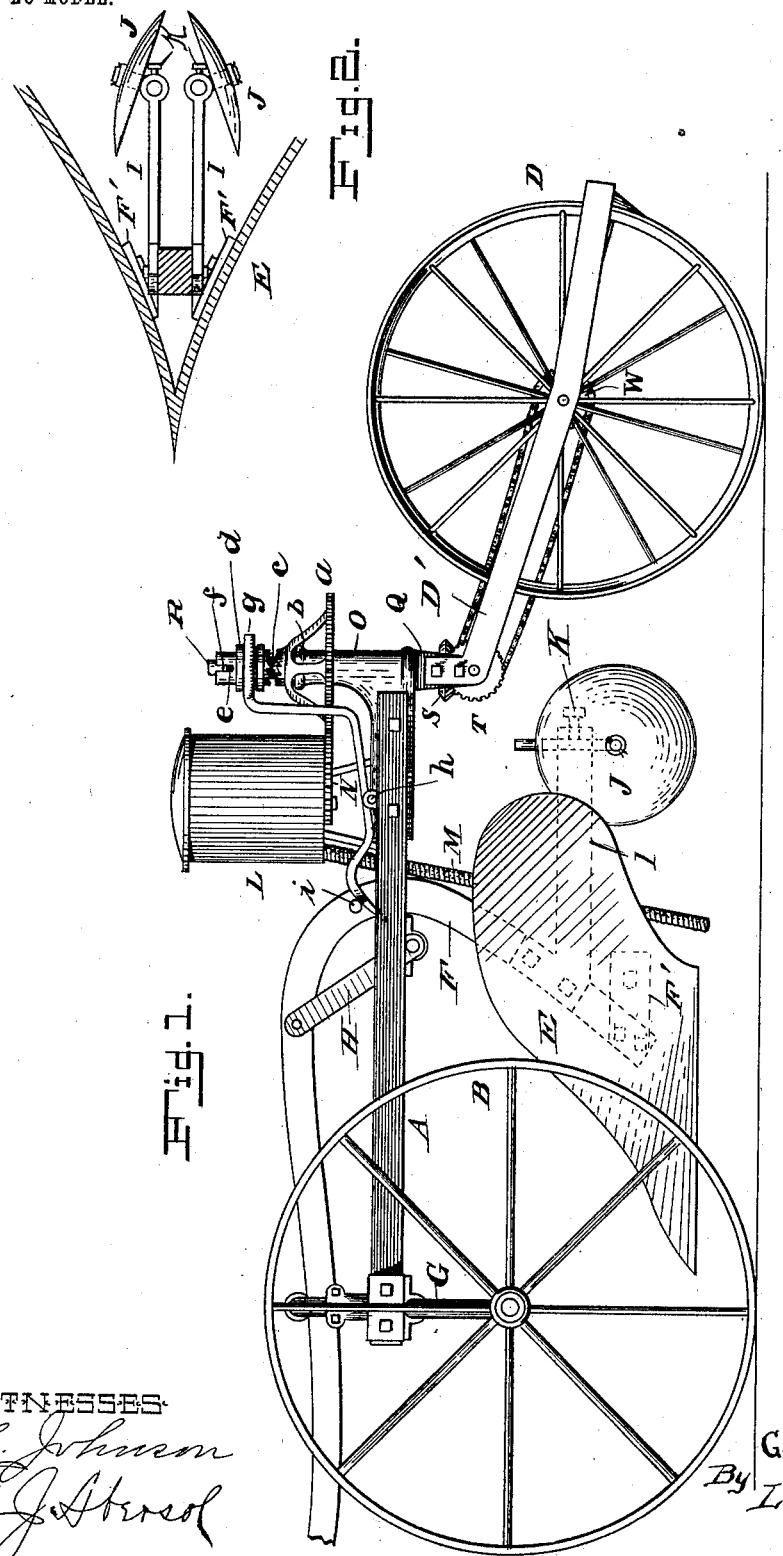

UNITED STATES PATENT OFFICE.

GEORGE E. EVANS, OF PEORIA, ILLINOIS, ASSIGNOR TO KINGMAN PLOW COMPANY, OF PEORIA, ILLINOIS, A CORPORATION OF ILLINOIS.

COMBINED LISTER PLOW AND PLANTER.

SPECIFICATION forming part of Letters Patent No. 718,994, dated January 27, 1903.

Application filed May 13, 1901. Serial No. 60,049. (No model.)

*To all whom it may concern:*

Be it known that I, GEORGE E. EVANS, a citizen of the United States, residing at Peoria, in the county of Peoria and State of Illinois, have invented certain new and useful Improvements in a Combined Lister Plow and Planter; and I do hereby declare that the following is a full, clear, and exact description of the invention, which will enable others skilled in the art to which it appertains to make and use the same.

This invention relates to that class of farm implements known as a "combined lister plow and planter."

The object of the invention is to drill in the seed by means of the usual follower-wheel which supports the rear end of the machine. A further object is to provide an arrangement whereby the said follower-wheel will drive the drilling mechanism regardless of the position it may occupy in following the various movements of the machine.

Another object of the invention is to automatically disengage the driving-gear which operates the drill when the plow is raised from the ground.

I am aware that devices of this nature have used follower-wheels, some of which were fixed and others free to turn as caster-wheels, both forms being used for driving the seeding devices; but none of them were arranged and used as mine is nor were capable of being thrown into and out of gear by the raising of the plow.

In the drawings herewith presented, Figure 1 is a side elevation of a lister plow and planter, showing my attachments. Fig. 2 is a plan view of the plow in cross-section, showing covering-disks which follow it. Fig. 3 is a plan view of the follower-wheel, showing different positions thereof in dotted lines. Fig. 4 is a detail of a sleeve which forms a part of the pivotal bearing for the follower-wheel. Fig. 5 is a part-sectional elevation of the arrangement for operating the drill and forming the pivotal support for the follower-wheel.

A indicates the frame of the machine, which may be of any desired form of outline, whose front end is supported by two carrying-wheels, (only one of which is shown,) the same being indicated by B. The rear end of the frame is supported by a follower-wheel D. The plow E is carried on the usual beam F, and the latter is carried at its forward end on the axle G and at its rear end by a link H, pivoted at one end to the said beam and having a bearing on the frame A. Said axle and link serve to raise and lower the beam, the former being arched and provided with the usual lifting-lever (not shown) by which said axle and beam may be raised and lowered, as described. The plow is attached to the beam by means of arms F' F', and above said arms two arms I I are secured to said beam, and the outer free end of each carries a disk J, set in the position shown in Fig. 2. Said disks are adjustable vertically and circularly, and a set-screw K serves to secure the same in a fixed position, as will be understood.

A seedbox L is mounted on the frame, and its spout M is carried down between the plow and disks, as shown, and the drilling attachment is driven by means of a gear-wheel N at the bottom of the box and the following-described mechanism: A sleeve O is held between the rear ends of the frame portions A and receives from below the stem P of a yoke Q. A shaft R passes up through the said stem and carries a gear-wheel S at its lower end, with which meshes a gear-wheel T on a horizontal shaft U, having bearings in the said yoke Q. A sprocket-wheel V on said shaft receives motion by means of a sprocket-chain from a sprocket-wheel W on the said wheel D or its shaft. Upon the top of the stem P is placed a washer $b$, upon which rests a sleeve $c$, which, together with said washer, is held in place by the shaft R, as will be understood. A gear-wheel $a$ is slipped over the sleeve $c$, but is independent thereof, so that said sleeve may turn without turning the said wheel. A shiftable sleeve $d$, also mounted on the sleeve $c$, revolves therewith and with the shaft R, being driven by means of a pin $e$, carried in said shaft. The sleeve $d$ and gear $a$ are provided with teeth which interlock to form a clutch, and the former is slotted at $f$, so that it can rise and fall on the sleeve $c$ to engage or release the said gear. A shifting lever $g$ is pivoted at $h$ on the frame A, its rear end engaging the clutch, and its free end is adapted to receive the impact of a pin $i$ on the plow-beam, so that when said beam is raised the clutch portions will be disengaged.

The rear end of the machine is supported by means of a follower-wheel D, which has two rims, together forming a covering-wheel, as well as a follower or caster wheel. Said wheel is supported between a U-shaped frame D', whose free ends are bolted to the yoke Q, as shown. Since the yoke and stem are of one piece and are free to turn within the sleeve O, the wheel D will be free to move on the pivot formed thereby, because secured to the yoke by the said frame D'. It will thus be plainly seen that the wheel will be free to follow the furrow, which is continually being opened before it, and by thus following it a more level path is traversed than those portions of the field over which the main carrying-wheels must pass and from which the seeding mechanism is usually driven. In consequence of driving the seeding devices from the follower-wheel an unvarying speed is maintained. This is of importance, since usually, or more often than otherwise, the seeding mechanism is driven from one of the main wheels, as above stated, and when so driven a varying speed results and a consequent uneven planting follows. By the construction I show the caster-wheel D readily swings from side to side, as when turning corners, without cramping the machine or interfering with the action of the seeding devices. As long as the wheel must work as a caster-wheel the operating mechanism must be carried up through the pivotal connection of the wheel with the plow-frame, and to this feature I attach much importance and, furthermore, desire to claim it as my own, since others have not heretofore done this. When the plow and disks are at work in the ground, the seeding mechanism is in continuous operation by permitting the sleeve $d$ to remain in engagement with the gear-wheel $a$; but when the plow and disks are raised the pin $i$ on the beam F depresses the lever $g$ and disengages the clutch portions, as described.

In addition to the advantage of being able to drive the seeding devices at a steady speed the driver's seat, though not shown, is placed about midway of the length of the frame A, so that the weight of the driver is about equally distributed on all the wheels. At the same time the driver is located just above the seedbox, so that he is in position to watch all operations, and in order that it may be watched it must be placed ahead of the pivoting-point of the caster-wheel.

It is to be understood that I disclaim everything in the structure of my machine except those portions that relate to a driving mechanism operated through the vertical pivot of the caster-wheel and driven from the latter by suitable means to operate the seeding devices located in the seedbox upon the main frame and except also as to the said seeding mechanism in combination with the shiftable plow-beam for starting or stopping the seeding devices.

Changes of one kind or another may be made in the structure of my device without departing from the spirit of the invention, and I claim—

1. In a three-wheeled lister, a frame, a crazy-wheel pivoted thereto to turn about a vertical axis, dropping mechanism supported on the frame, and means actuated by the crazy-wheel for operating said dropping mechanism.

2. In a three-wheeled lister, a frame mounted on two main wheels, a crazy-wheel pivoted to the frame to swing about a vertical axis, a rotary corn-dropping mechanism secured to a fixed portion of the frame, and operative connections between the latter and the crazy-wheel whereby said corn-dropper is driven from the crazy-wheel.

3. In a three-wheeled lister, a frame, a corn-dropping mechanism supported thereby, a crazy-wheel swiveled to the frame to swing horizontally thereof and flexible connections between said crazy-wheel and corn-dropping mechanism, whereby the corn-dropping mechanism may be operated from the crazy-wheel in any position of the latter.

4. In a three-wheeled lister, a frame supported on two main wheels and a third rear wheel connected to the frame to rotate about a horizontal axis and to turn bodily about a vertical axis, a corn-dropping mechanism supported on the frame, and flexible connections between the latter and the third wheel, whereby the said corn-dropping mechanism may be rotated from the third wheel in any position of the latter.

5. In a riding-lister, a frame, a corn-dropping disk having a fixed position on the frame, a traction-wheel pivoted to swing about a vertical axis, connections between the traction-wheel and the disk whereby the rotation of the wheel operates the disk, and means for throwing said disk out of operation when the lister or plow is raised.

6. In a riding-lister, a frame, dropping mechanism having a fixed position thereon, a traction-wheel, connections between said traction-wheel and dropping mechanism, including a clutch, and means to throw said clutch out of operation when the lister is raised.

7. In a lister, a frame, a corn-dropping mechanism supported by and having a fixed position on the frame, a traction-wheel pivoted to the frame to have a bodily movement relative to the corn-dropping mechanism, and connections between said traction-wheel and corn-dropping mechanism whereby the corn-dropping mechanism can be operated at different relative positions of the traction-wheel.

8. In a riding-lister, a frame, a corn-dropping mechanism supported in a fixed position thereon, a traction-wheel, means to operate the corn-dropping mechanism from the traction-wheel, and means whereby said corn-dropping mechanism is rendered inoperative when the lister is raised.

9. In a combined lister plow and planter, the combination of the frame of the implement, wheels for carrying the forward end of said frame, a plow and its beam carried by said frame, a rear caster-wheel supporting the rear end of the frame the same being pivotally attached to the frame and permitted thereby to swing freely thereon, a vertical shaft located within such pivotal attachment, a seedbox upon the plow-frame, seeding mechanism within said box, the same being operated from said shaft, and means for imparting motion to the said shaft from the said caster-wheel to drive the seeding devices substantially as described.

10. In a lister plow and planter the combination of the main frame upon which the seedbox and plow are carried, said frame having carrying-wheels for supporting its forward end, a rear caster-wheel pivotally carried from the rear end of the plow-frame and supporting the said rear end, and mechanism for operating the seeding devices within the seedbox from the follower-wheel through the pivot for said wheel substantially as set forth and described.

11. In a lister plow and planter the main frame having the seedbox and plow, wheels for supporting the forward end of the frame, a rear follower-wheel having a supporting-frame pivotally connected to the rear end of the latter, in the main frame for supporting the latter, in combination with a vertical shaft located within the pivotal connection and arranged to revolve therein, means between the lower end of such shaft and the said follower-wheel for driving said shaft, and means also between the upper end of the shaft and the seedbox for operating the seeding devices and mechanism for connecting and disconnecting the driving parts whereby the seeding devices may be operated or stopped automatically by the lowering or raising of the plow as set forth.

12. In a combined lister plow and planter, the main frame having the seedbox, a plow and plow-beam pivotally carried on said frame and adapted to be raised and lowered for the purposes explained, carrying-wheels for the front of the plow-frame, a rear follower-wheel for supporting the rear end of the plow-frame, a rigid frame for the said wheel, a vertical hollow stem secured to the forward end of the wheel-frame, a vertical sleeve attached to the rear end of the plow-frame for receiving the stem of the wheel-frame, said stem and sleeve forming the pivot upon which the follower-wheel swings horizontally but jointly holding the wheel and plow frame relatively rigid as regards vertical movement, means carried up through the stem and sleeve for operating the seeding devices within the seedbox and driving mechanism between the wheel and the stem for driving the said seeding means within the seedbox.

13. In a combined lister plow and planter, the main frame, the seedbox located thereon and the plow-beam pivoted thereto, of wheels for supporting the forward end of the frame, a rear follower-wheel pivotally carried at the rear end of the frame, the same supporting the rear end of the plow-frame and adapted to move horizontally on its pivot, said frame and wheel being held relatively rigid as regards vertical movement, a shaft passing through the pivot of the follower-wheel, means for driving the same at its lower end from the said wheel, mechanism between the upper end of the shaft and the seedbox for operating the seeding devices, a shiftable clutch at the top of the shaft, a lever on the plow-frame adapted to shift and disengage the clutch from its counterpart by contact of the plow-beam with said lever when the plow is raised out of the ground substantially as set forth.

14. In a combined lister plow and planter, the plow-frame A, the seedbox L, the plow-beam F, the front carrying-wheels B, the rear follower-wheel D for supporting the rear end of the frame, the frame D' carried by the said wheel, the hollow vertical stem P rigidly attached to said wheel-frame, the sleeve O secured to the frame A for receiving the stem P, the loose gear-wheel $a$ mounted to revolve with the shaft when dropping the seed, said gear adapted for driving the seeding device within the seedbox and having a series of teeth or serrations on its hub, the sleeve $d$ above the gear $a$ and shiftable vertically, said sleeve having serrations to engage the serrations of the gear-wheel, the lever $g$ fulcrumed on the plow and having one end free and the other in engagement with the sleeve $d$, said lever adapted to be depressed at its free end to raise the end thereof in engagement with the sleeve $d$ to disengage said sleeve and gear to stop the dropping of seed, said lever being depressed by contact of the plow-beam with said lever when the former is raised as set forth.

In testimony whereof I affix my signature in presence of two witnesses.

GEORGE E. EVANS.

Witnesses:
S. H. HUNT,
W. B. KINGMAN.